Sept. 12, 1944.  O. WITTEL  2,358,121
FOCUSING CAMERA
Filed May 11, 1942  3 Sheets-Sheet 1
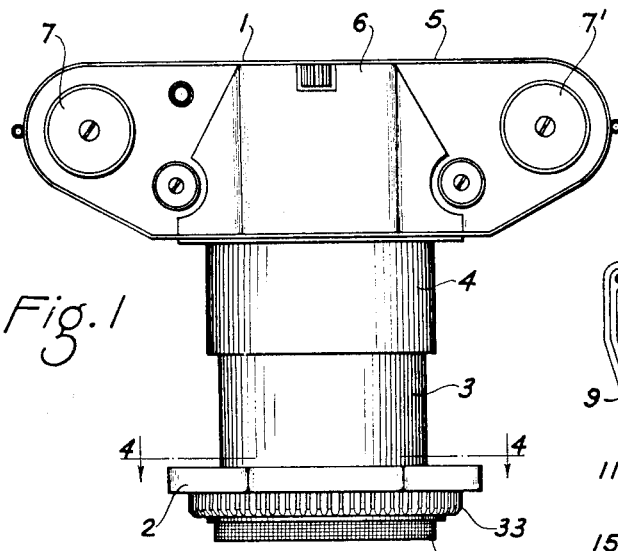
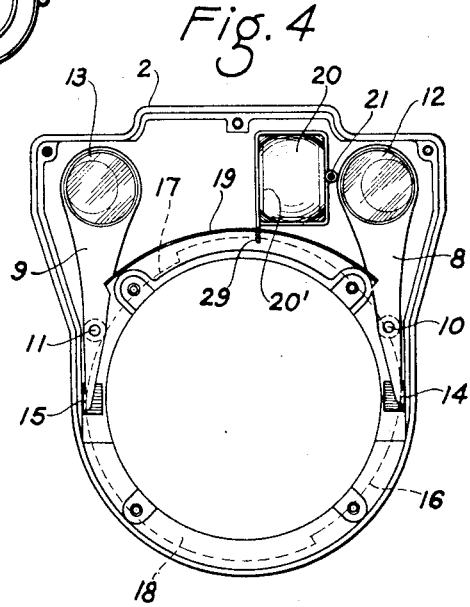
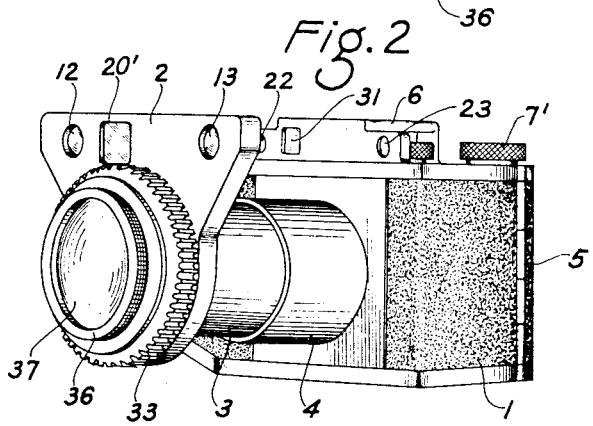
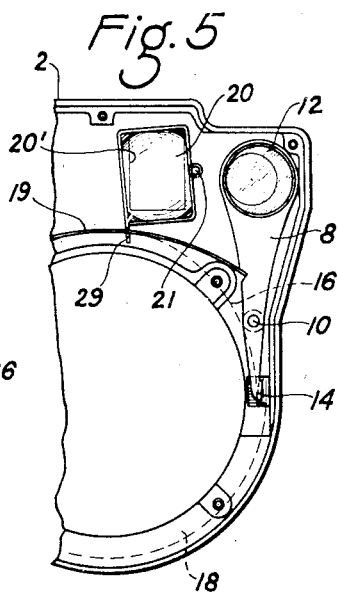
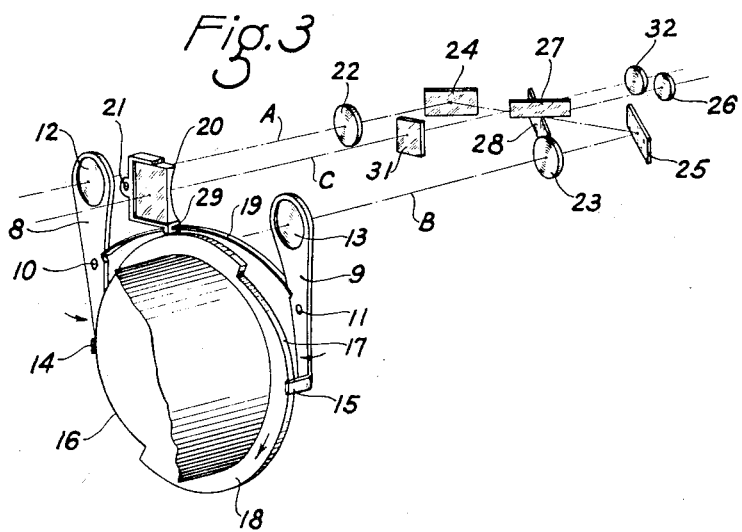
Otto Wittel
INVENTOR
BY
ATTORNEYS Sept. 12, 1944.                    O. WITTEL                       2,358,121
                                FOCUSING CAMERA
                             Filed May 11, 1942              3 Sheets-Sheet 2
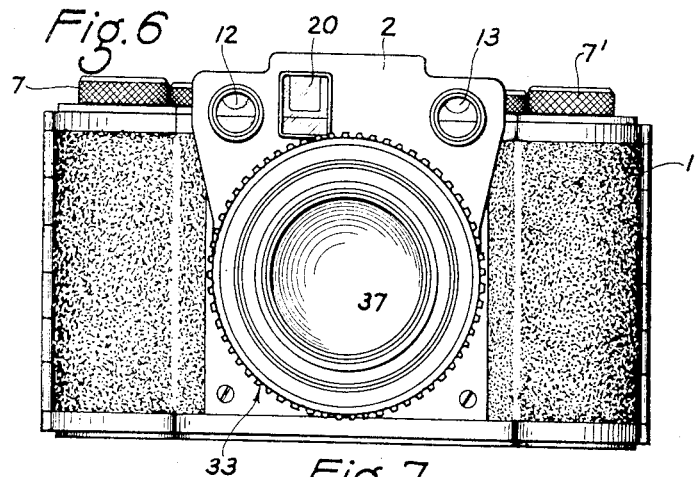
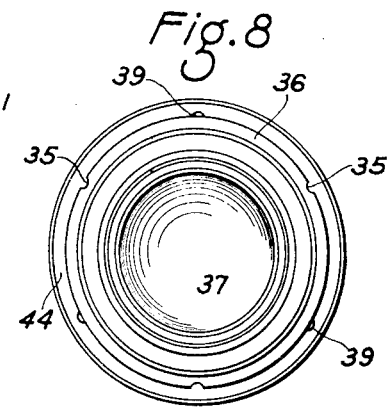
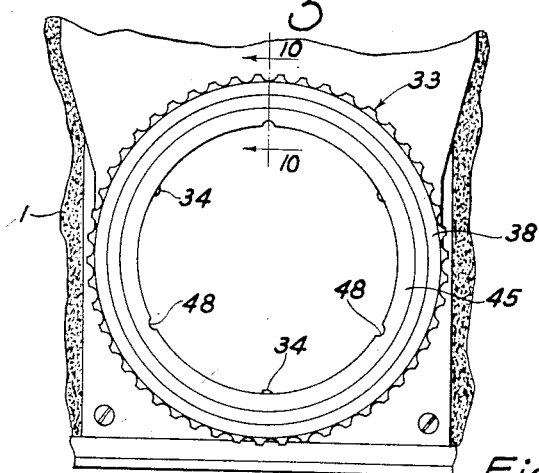
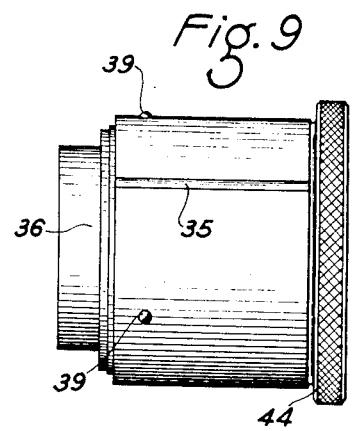
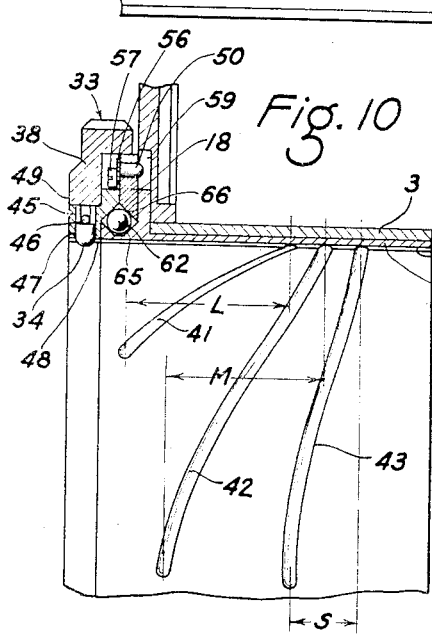
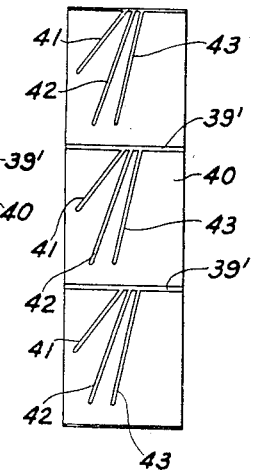
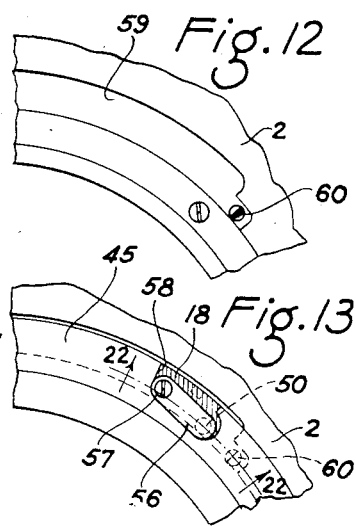
Otto Wittel
INVENTOR
BY
ATTORNEYS Sept. 12, 1944.  O. WITTEL  2,358,121
FOCUSING CAMERA
Filed May 11, 1942  3 Sheets-Sheet 3
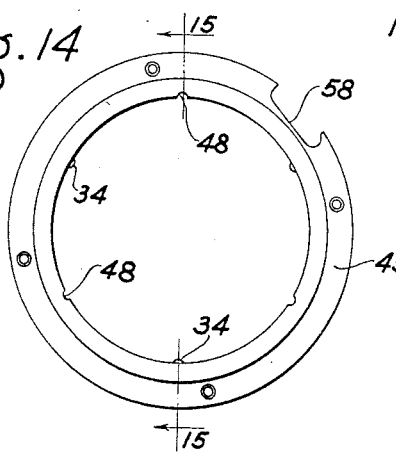
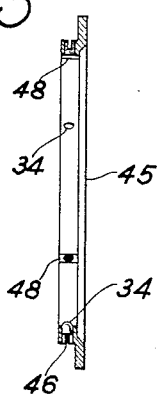
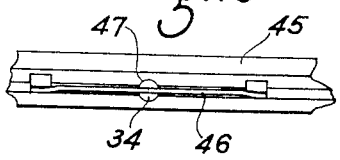
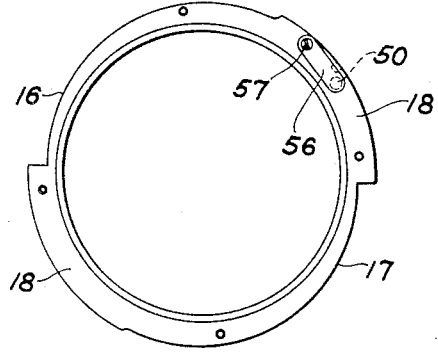
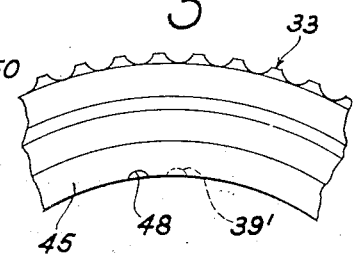
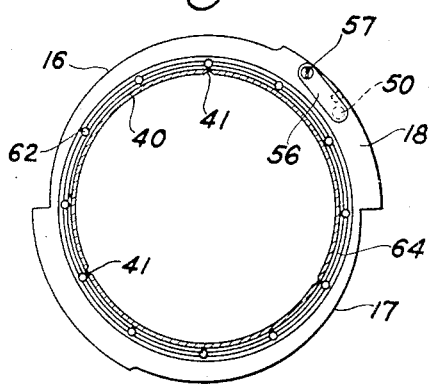
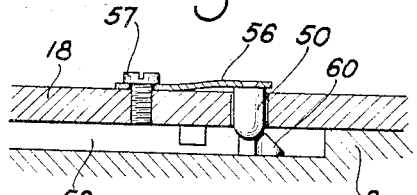
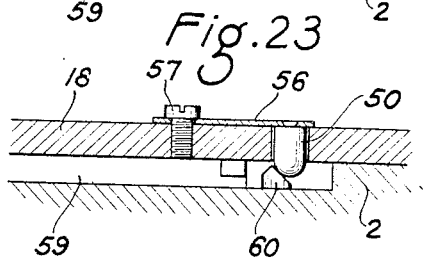
Otto Wittel
INVENTOR
BY
ATTORNEYS Patented Sept. 12, 1944

2,358,121

UNITED STATES PATENT OFFICE 2,358,121

FOCUSING CAMERA

Otto Wittel, Rochester, N. Y., assignor to Eastman Kodak Company, Rochester, N. Y., a corporation of New Jersey Application May 11, 1942, Serial No. 442,405

17 Claims. (Cl. 95—44)

This invention relates to photography and more particularly to photographic cameras. One object of my invention is to provide a camera with a simple type of focusing mechanism with which a number of lenses of different focal lengths may cooperate. Another object of my invention is to provide a means for properly locating different focal length lenses on a focusing camera so that these lenses may be used without adjustment with the focusing mechanism carried by the camera. Another object of my invention is to provide a focusing camera with a structure which permits an objective to be placed on and taken off the camera, this mechanism also serving to lock the objective on a camera front in the proper relationship with the camera focusing mechanism. Other objects will appear from the following specification, the novel features being particularly pointed out in the claims at the end thereof.

Heretofore, cameras have been made with focusing mechanisms which may function with lenses of different focal lengths, but it has usually been necessary to provide either on the camera or on the lens mount some special equipment or apparatus to adjust lenses of different focal length to the standard focusing mechanism built into the camera. In the present instance I have provided a mechanism in which each lens mount may be extremely simple and in which there is no possibility of mistake or no adjustment necessary when a particular focal length objective is positioned in a picture-taking position on a camera.

Coming now to the drawings wherein like reference characters denote like parts throughout:

Fig. 1 is a top plan view of a camera in an extended or picture-taking position in which the camera includes a preferred embodiment of my invention;

Fig. 2 is a perspective view of the camera shown in Fig. 1 in an extended or picture-taking position;

Fig. 3 is a perspective diagrammatic view of a range finder which may be used in the camera shown in the preceding figures;

Fig. 4 is a section taken on line 4—4 of the camera front, certain parts being removed to show portions of the range finder;

Fig. 5 is a fragmentary view showing a portion of the range finder shown in Fig. 4 with movable elements of a part of the range finder and view finder in a different position from that shown in Fig. 4;

Fig. 6 is a front plan view of the camera shown in Figs. 1 and 2;

Fig. 7 is an enlarged partial end elevation showing the camera front with the objective removed;

Fig. 8 is an end elevation of a lens mount adapted to be received by the camera front shown in Fig. 7;

Fig. 9 is a side elevation of a lens mount shown in Fig. 8;

Fig. 10 is a fragmentary detail section taken on line 10—10 of Fig. 7 and showing a portion of the focusing mechanism;

Fig. 11 is a diagrammatic view showing a development of the focusing sleeve so as to show the relationship of a plurality of sets of focusing cams;

Fig. 12 is a fragmentary sectional elevation showing a portion of the camera front which is formed to provide a space for a lens locking ring;

Fig. 13 is a fragmentary view similar to Fig. 12, but including a locking mechanism also shown in Figs. 22 and 23;

Fig. 14 is a front plan view of the driving ring removed from the camera front;

Fig. 15 is a section taken on line 15—15 of Fig. 14;

Fig. 16 is a fragmentary detail elevation showing a mount for the balls carrying the drive ring;

Fig. 17 is an enlarged detail section showing portions of the focusing ring a supplementary drive ring and a focusing cam carrying member assembly;

Fig. 18 is a plan view of a focusing cam ring;

Fig. 19 is a side elevation of the ring shown in Fig. 18 including a stop and latch element;

Fig. 20 is a fragmentary view showing the relative position of the tubular element slot and the locking ring slot when a lens mount is latched in position on the camera front;

Fig. 21 is a plan view of the focusing sleeve and cam showing the manner in which balls are mounted in a ball race;

Fig. 22 is an enlarged fragmentary sectional view of a lens mount latch structure, the parts being shown in the unlatched position;

Fig. 23 is a similar view to Fig. 22 except that the parts are shown in their latched position.

My invention broadly consists in providing a camera of a type in which a lens mount is moved relative to a camera front for focusing an objective at different focal distances. The camera may or may not be of the variety which collapses or folds, but in the present instance I have shown the camera of the type in which there are telescoping tubular extensions which permit the camera to be moved from a folded position to a picture-taking position, shown in Fig. 1, in which the camera front is extended in respect to the camera body. My invention further includes a ring which may be turned to focus an objective, this focusing movement moving the objective axially in a tubular member and registering the focal distance on a suitable scale as well as also adjusting one or more movable elements of a range finder to indicate optically when an object is properly focused by the objective on a film.

More specifically, the camera may consist of a camera body 1 having a camera frot 2 mounted on a pair of telescopic tubular members 3, 4 which may move into the camera body 1 to collapse the camera. The folding or collapsing structure may be the same as that shown in my Patent No. 2,126,300, Collapsible camera, granted August 9, 1938.

The camera body may have the usual camera back 5 which may be opened to load a film into position for exposure. It may also include a housing 6 which may contain a portion of the range finder structure and a film winding knob 7 and a rewinding knob 7' for returning the film to an original casette or container. As thus far described, the structure may be of known type.

I prefer to provide the camera front 2 in the form of a shallow box-like structure which may contain portions of a range finder diagrammatically shown in Fig. 3. The range finder may consist of a pair of levers 8 and 9 pivoted at 10 and 11 to the camera front 2, each one of these levers carrying a positive lens 12 and 13 on one end. The opposite ends of the lever carry pins 14 and 15 which rest against and are moved by the cam surfaces 16 and 17 of the cam ring 18 best shown in Fig. 18. The levers 8 and 9 are spring-pressed in the direction shown by arrows in Fig. 3 about their pivots 10 and 11 by means of a leaf spring 19 which engages both of the levers just above their pivotal points 10 and 11. This spring has the function of holding the pins 14 and 15 against the cam surfaces 16 and 17 and, in addition, it adjusts a view finder lens 20 about its pivot 21 so that parallax will be automatically cared for.

The range finder lenses 12 and 13 may move to and from each other to vary the angle of light rays passing to the lenses 22 and 23 which form images of an object reflected by the fixed mirrors 24 and 25 in a position to be viewed by an eyepiece 26 which is preferably made adjustable in a known manner to accommodate the vision of the user. Lines A and B represent the axes of the two light beams which, after being reflected by the mirrors 24 and 25, are reflected by the two mirrors 27 and 28 to form a split image so that when the two split portions of the image are brought into registration the object will be found to be in focus. Thus, mirror 27 reflects the upper portion of the image viewed through the eyepiece 26 and mirror 28 reflects the lower portion of the image. It is, therefore, obvious that when the cam ring 18 is turned to focus the camera objective, as will be later described, as soon as the two half images are brought into registration the objective will be in focus.

The camera front 2 is provided with a view finder frame 20' which is smaller than the negative lens 20 pivoted at 21 as above described. Since the spring 19 engages a fork 29 carrying the pivoted lens 20, it turns about the pivot 21 as the spring 19 is bowed to a greater or lesser extent with the movement of the levers 8 and 9. The shape of spring 19 has been so selected that its movement will properly adjust the lens 20 to overcome parallax so that the view as framed by the frame 20' will always be found to coincide with the view formed on a film at the film gate. The axis C of the view finding optical system passes through a plain glass window 31 carried by the camera body housing 6 and there is an eyepiece 32 in the rear of the housing 6 for viewing the view finder image. Thus a user may find the desired image by looking through the eyepiece 32 and after selecting the object to be focused may view through the eyepiece 26 the split images formed by the mirrors 27 and 28, and by turning the knurled ring 33 may cause the split images to coincide, thus focusing the objective through the structure which will now be described.

Referring to Fig. 10 it will be noticed that the focusing ring 33 consists of a number of parts which may be moved together and which may turn relative to the camera front 2. The knurled ring includes one or more downwardly extending rounded plugs 34 which serve as the objective driving elements since each of the plugs 34, here shown as three in number, is adapted to engage in complementally-shaped grooves 35 in a lens barrel 36 which carries an objective 37 and which, as best shown in Figs. 8 and 9, includes a knurled outer ring 44 and a series of spring-pressed balls 39—here shown as three in number. Thus, when an objective is entered into the tubular member 40, it may be guided axially thereof by means of the plugs 34 and the guideways 35. The spring balls 39 may press outwardly and into engagement with the guides 39' and the cams 41, designated to receive them.

Assuming that the objective shown in Fig. 9 is a long focused objective, and that the balls 39 are positioned relative to the shoulder 44 on the lens mount in such a position that they will engage only the cams 41, then by sliding the lens mount into the tubular member 40 with the pins 34 guiding the lens mount axially, the spring-pressed balls 39 will slide in the slideways 39' until the end of slot 41 is reached. Thus, when the lens mount is turned through the pins 34 engaging the slots 35, the lens mount will move in and out of the tubular member 40 through the engagement of the balls 39 which constitute cam followers with the grooves 41 which form cams. Since the pitch of the grooves 41 are all alike and are selected for a lens of the predetermined focal length, as soon as the lens is engaged with these cams, it is in the position to focus and this focusing movement occurs through turning the knurled ring 33.

As the knurled ring 33 turns it also turns the cam ring 18 which is attached to it and it likewise turns the driving ring 45 which is attached to the knurled ring. This driving ring is best shown in Figs. 14 and 15. Fig. 16 shows the method of mounting the spring pins 34, these pins being held in place and pressed inwardly by means of spring members 46 pressing downwardly on the top of the pins. Since the shape of the opening 47 (Fig. 10) is of insufficient diameter to permit the pin to pass through, it is normally held in the position shown in this figure, in which it projects downwardly a distance sufficient to engage and substantially fill groove 35 of the lens mount (Fig. 9).

It is desirable to provide a means for preventing the lens mount from being accidentally withdrawn from the camera front 2 for, while this is not apt to occur with the lens focused on a nearby object, it may readily occur when the lens is in its most retracted position, because if some means were not provided to prevent it, the lens could then be axially slid in the tubular member 40 and removed from the lens mount.

Accordingly, the assembly forming the driving ring which consists of the knurled ring 33, the ring 45 shown in Fig. 14, and the ring 18 shown in Fig. 18 are provided with a means for retaining the lens in the tubular member 40. Referring to Fig. 14 it will be noticed that there are three inwardly extending spring plugs 34 and there are three sets of grooves 48, these grooves extending axially through the flange and being positioned in alignment with the three sets of slots 39' in the tubular member 40 when the knurled ring 33 is in a position for inserting a lens mount 36. When the slots 48 and 39' are in alignment a straight axial movement of the lens mount slides it into a position in which the flange 44 of the lens mount may come to rest against the front edge 49 of the knurled ring assembly so that when in that position the spring-pressed balls 39 will lie in the end of the cam slots 41 at the juncture of these slots with the axially extending slots 39'.

In this position there is a latch element 50 shown in Figs. 18, 22 and 23 which is carried by the ring 18 which lies in the inoperative position shown in Fig. 22. This latch element consists of a rounded plug carried by a leaf spring 56 attached by a screw 57 to the ring 18 and extending into a cutout portion 58 in the periphery of the ring 45. It may extend into a slot shown in Figs. 22 and 23 at 59 formed in the camera front 2 so that it may engage a beveled plug 60. With the parts shown in the position indicated in Fig. 22, if it is assumed that a lens mount has been slid into the tubular element 40, the slots 48 and 39' will be in alignment. In order to prevent the lens from sliding outwardly, the ring assembly is moved so that ring 18 is moved until the latching element 55 snaps over the beveled plug 60, thus moving the slots 48 out of alignment with the slots 39' as shown in Fig. 20, thereby preventing the lens mount from accidentally falling from the front of the camera.

It should be noticed that the knurled ring assembly is mounted to turn relative to the lens front 2 on ball bearings 62 which, as shown in Fig. 21, may be spaced by a spacing rod 64, the lower portion of the ball race 65 being carried by the tubular extension member 3 and the upper portion 66 of the ball race being formed between beveled edges carried by the rings 18 and 45, both of which are attached by means of screws 67 and secured by the screws 68 to the knurled ring 33 to form the knurled ring assembly which turns as a single unit during the focusing operation.

It should be noticed that the knurled ring assembly is always turned through a like angle in focusing lenses of different focal lengths for similar focal distances. In other words, when the ring 33 is turned through a portion of a revolution—say for instance through 30°—the cam ring 18 will likewise be turned and the range finder will be adjusted because the movable parts of the optical system will be moved. If a short focus lens is used the cams 43 may move the lens a distance S (Fig. 10), since this distance is selected to move such a lens through the desirable range of movement. Thus, during this movement a spring-pressed ball 39 will be moved by being turned through the cam slot 43.

If a slightly longer focal length objective is used, since the cam followers 39 will follow the curve in the cams 42, they will move a distance M which, as indicated in Fig. 10, is a considerably greater distance than the distance S even though the knurled ring 3, and with it the range finder, is adjusted to the same extent as before since the knurled ring 3 turns to the same degree. In a long focus lens the lens will move a distance indicated in Fig. 10 at L.

The operation of this camera is extremely simple because it requires a minimum effort on the part of the operator in that the camera can be very rapidly put into operation by drawing out the camera front 2 relative to the camera body and by turning the knurled ring 33 until the split image reflected by the mirrors 27 and 28 will come into registration at which time the camera is in focus. During this focusing movement of the ring 33 the levers 8 and 9 have been rocked about their pivots 10 and 11 so that the spring 19 has been formed. As this spring flexes it moves the view finder lens 20 about its pivot 21 and behind its frame 28 so that the finder is always properly adjusted to include the view at the point of principal focus or in other words to overcome parallax.

If the operator should decide to use another lens it is only necessary for him to turn the knurled ring assembly 33 until the pin 55 snaps over the beveled plug 60 permitting the grooves 48 and 39' to be aligned so that the lens may be slid from the tubular element 40. It is then possible to slide in a second objective in a lens mount similar to that shown in Fig. 9 in all respects except that the distance between the cam followers or spring-pressed balls 39 to the flange 44 should correspond to the innermost portion of the cam groove designed for the particular lens. In other words, if the lens should be an extremely long focus lens utilizing the cam slots 41 the distance between the cam followers 39 and the shoulder 44 should be equal to the distance between the innermost end of the cam slot 41 and the shoulder 49 as indicated in Fig. 10.

It should be also noticed that the lens mount itself is extremely simple and is provided with a minimum of projecting or unsightly parts since the only projecting parts required are the cam followers 39.

The arrangement of my improved range finder is desirable because the movable parts are enclosed, the lens elements 12 and 13 with their moving and supporting levers being enclosed in the camera front 2 and the remainder of the optical parts, namely the lenses 22 and 23, are mounted in windows in the front of the housing 6 so that no dirt or dust can reach the parts of the range finder. This type of mechanism has an additional advantage in that movable parts of the range finder and view finder can be carried by a camera front close to the front of a camera objective so that there is no danger of any portion of the objective cutting off the field of view of the finder or obscuring parts of the range finder.

What I claim as new and desire to secure by Letters Patent of the United States is:

1. In a camera, the combination with a camera body, of a camera front mounted to move thereon to and from an open or picture-taking position, an optical range finder comprising two sets of optical elements, one carried by the camera body, the other carried by the camera front, a movable mount for at least one of said optical elements carried by the camera front, a driving member carried by the camera front to turn thereon but not to slide axially relative thereto, connections between said driving member and the movably mounted optical element for moving the latter in predetermined relationship to the former through a focusing range of movement, a removable lens mount, and a disengageable coupling between the driving member and the removable lens mount for releasably connecting the member to the mount and for moving the latter from the former for focusing.

2. In a camera, the combination with a camera body, of a camera front mounted to move thereon to and from an open or picture-taking position, an optical range finder comprising two sets of optical elements, one carried by the camera body, the other carried by the camera front, a movable mount for at least one of said optical elements carried by the camera front, a driving member carried by the camera front to turn thereon but not to slide axially relative thereto, a tubular member connected to said front, connections between said driving member and the movably mounted optical element for moving the latter in predetermined relationship to the former through a focusing range of movement, a removable lens mount positionable in said tubular member, a disengageable coupling between the driving member and the removable lens mount for releasably connecting said member to said mount and for moving the latter from the former for focusing, and locating means carried by the driving member and lens mount for facilitating engagement of the coupling when said lens mount is positioned in said tubular member.

3. In a camera, the combination with a camera body of a camera front movably mounted with respect thereto for movement to and from an open or picture-taking position, an optical range finder including fixedly and movably mounted elements on the camera body and camera front respectively, an angularly movable driving member carried by the camera front, said driving member being held against axial movement relative to the camera front, a tubular member connected to said front, a cam on said driving member, connections between said cam and the movably mounted optical element carried by the camera front, a second cam inside the tubular member and completely enclosed thereby, a removable lens mount insertable in said tubular member, a cam follower carried by the lens mount and adapted to engage said second cam, and cooperating means on the driving member and lens mount for positioning the last mentioned cam to engage said cam follower when said lens mount is inserted into the tubular member.

4. In a camera, the combination with a camera body, of a camera front movably mounted with respect thereto for movement to and from an open or picture-taking position, an optical range finder including fixedly and movably mounted elements on the camera body and camera front respectively, an angularly movable driving member carried by the camera front, said driving member being held against axial movement relative to the camera front, a tubular member connected to said front, a cam on said driving member, connections between said cam and the movably mounted optical element carried by the camera front, a plurality of independent cams inside the tubular member and completely enclosed thereby, a removable lens mount insertable in said tubular member, a cam follower carried by the lens mount and adapted to engage a predetermined one of said cams in said tubular member, and cooperating means on the driving member and lens mount for so positioning the cam follower when said lens mount is inserted into the tubular member whereby said cam follower may engage only the preselected cam on said tubular member.

5. In a camera, the combination with a camera body, of a camera front movably mounted with respect thereto for movement to and from an open or picture-taking position, an optical range finder including fixedly and movably mounted elements on the camera body and camera front respectively, an angularly movable driving member carried by the camera front, said driving member being held against axial movement relative to the camera front, a tubular member connected to said front, a cam on said driving member, connections between said cam and a movably mounted optical element carried by the camera front, a plurality of cams enclosed in the tubular member, each of a shape for a lens of predetermined focal length, a lens mount including a lens of predetermined focal length, a cam follower carried thereby, and means automatically actuated by inserting said lens mount in said tubular member for coupling the lens mount in a position in which said cam follower may be engaged with the proper cam of the tubular member for the focal length of the lens carried by the lens mount.

6. In a camera, the combination with a camera body of a camera front movably mounted with respect thereto for movement to and from an open or picture-taking position, an optical range finder including fixedly and movably mounted elements on the camera body and camera front respectively, an angularly movable driving member carried by the camera front, said driving member being held against axial movement relative to the camera front, a tubular member connected to said front, a cam on said driving member, connections between said cam and a movably mounted optical element carried by the camera front, a second cam inside the tubular member, a lens mount, a cam follower carried by the lens mount and engaging said second cam, a finder optical system including a finder frame, a pivotally mounted lens adjacent the finder frame, and connections between the finder frame and the movably mounted optical element on the camera front for moving the finder lens to overcome parallax in the finder as the driving member is moved to move the lens mount and optical element to various focal positions.

7. In a camera, the combination with a camera body, of a camera front movably mounted with respect thereto for movement to and from an open or picture-taking position, an optical range finder including fixedly and movably mounted elements, said movable elements comprising a pair of lenses, levers pivoted to the camera front for moving the lenses, a driving member mounted to turn but not to slide axially on the camera front, a tubular member carried by the camera front, cams carried by the driving member for moving said levers, a spring means holding the levers in engagement with the cams, a finder comprising a finder frame, a lens pivotally mounted adjacent said frame, and positioned to engage the spring means holding the levers against the cams to move the finder lens simultaneously with the movable range finder elements, an objective including a lens tube insertable into said tubular member, means connecting said driving member in driving relation with said lens tube, and coupling means between the tubular member and lens mount constituting a cam and cam follower for focusing the lens as said driving member is turned.

8. In a camera, the combination with a camera body, of a camera front mounted on the camera body and including a housing spaced therefrom, a range finder including optical elements fixedly mounted on the camera body, and including spaced reflectors, a pair of lenses carried by the camera front in alignment with said spaced reflectors, a pivotal mount for each lens carried by the camera front, a tubular member carried by the camera front, a driving member including cam surfaces turnably mounted on the camera front, and positioned to engage the two pivotal mounts, a single leaf spring between the two pivotal mounts holding said mounts in engagement with said cam surfaces to be moved thereby, a view finder frame, a view finder lens pivotally mounted adjacent said frame and in contact with said leaf spring whereby flexing of said spring may move said finder lens transversely of the finder frame, a cam groove carried by said tubular member, an objective including a lens mount, a spring-pressed cam follower ball carried by said lens mount and lying in said groove, connections between the driving member and the lens mount, whereby movement of the driving member may focus the lens, the range finder and adjust the view finder for parallax.

9. In a camera, the combination with a camera body, of a camera front movably mounted with respect thereto for movement to and from an open or picture-taking position, an optical range finder including fixedly and movably mounted elements on the camera body and camera front respectively, an angularly movable driving member carried by the camera front, said driving member being held against axial movement relative to the camera front, a tubular member connected to said front, a cam on said driving member, connections between said cam and a movably mounted optical element carried by the camera front, focusing cams of different pitch formed on the inner surface of said tubular member, said tubular member being adapted to selectively receive a plurality of lens mounts of different focal lengths, each of said mounts being provided with a cam follower so positioned thereon as to engage only a predetermined focusing cam when the mount is positioned in said tubular member, connections between the driving member and the lens mount positioned in the tubular member, and an axially positioned guide extending from each of said focusing cams to the exterior of the tubular member for guiding the cam follower of each lens mount axially until it reaches the focusing cam with which it cooperates for focusing the lens when said driving member is turned to turn the lens mount in the tubular member.

10. In a camera, the combination with a camera body, of a camera front movably mounted with respect thereto for movement to and from an open or picture-taking position, an optical range finder including fixedly and movably mounted elements on the camera body and camera front respectively, an angularly movable driving member carried by the camera front, said driving member being held against axial movement relative to the camera front, a tubular member connected to said front, a cam on said driving member, connections between said cam and a movably mounted optical element carried by the camera front, a plurality of cam grooves of different pitches formed on said tubular member and adapted to focus lenses of different focal length, said tubular member being adapted to selectively receive lens mounts having lenses of different focal lengths, each of said mounts being provided with a cam follower so positioned thereon as to engage only a predetermined groove in said tubular member when the mount is positioned therein, means for operatively connecting the mount positioned in said tubular member to said drive means to move said cam follower along said predetermined groove to focus the mount and a guideway for directing a cam follower into its cam comprising a groove axially positioned in the tubular member and extending to the outer end thereof.

11. In a camera, the combination with a camera body, of a camera front movably mounted with respect thereto for movement to and from an open or picture-taking position, an optical range finder including fixedly and movably mounted elements on the camera body and camera front respectively, an angularly movable driving member carried by the camera front, said driving member being held against axial movement relative to the camera front, a tubular member connected to said front, a cam on said driving member, connections between said cam and a movably mounted optical element carried by the camera front, a plurality of cam grooves of different pitches formed on said tubular member and adapted to focus lenses of different focal lengths, said tubular member being adapted to selectively receive lens mounts of different focal lengths, each of said mounts being provided with a cam follower so positioned thereon as to engage only a predetermined groove in said tubular member when the mount is positioned thereon, means for operatively connecting the mount positioned in said tubular member to said drive means to move said cam follower along said predetermined groove to focus the mount, a guideway for directing each cam follower into its proper cam comprising a groove axially positioned in the tubular member and extending to the outer end thereof, and a stop carried by each mount to limit the inward movement of a lens mount to a position in which the cam follower thereon may engage only the proper pitch cam.

12. In a camera, the combination with a camera body, of a camera front movably mounted with respect thereto for movement to and from an open or picture-taking position, an optical range finder including fixedly and movably mounted elements on the camera body and camera front respectively, an angularly movable driving member carried by the camera front, said driving member being held against axial movement relative to the camera front, a tubular member connected to said front, a cam on said driving member, connections between said cam and a movably mounted optical element carried by the camera front, focusing cams of different pitch formed on the inner surface of said tubular member, said tubular member being adapted to selectively receive lens mounts of different focal lengths, each mount being provided with a cam follower so positioned thereon as to engage only one of said focusing cams when the mount is arranged in said tubular member, connections between the driving member and a lens mount positioned in the tubular member, and an axially positioned guide extending from each focusing cam to the exterior of the tubular member for guiding the cam follower of the lens mount axially until it reaches the focusing cam to be guided thereby for focusing the lens when said driving member is turned to turn the lens mount in the tubular member a ring movably mounted on the tubular member having a guide extending axially of the ring, and means for moving the ring to a position in which the guide thereon may constitute a continuation of the guide in the tubular member to permit the insertion and removal of lens mounts.

13. In a camera, the combination with a camera body, of a camera front movably mounted with respect thereto for movement to and from an open or picture-taking postion, an optical range finder including fixedly and movably mounted elements on the camera body and camera front respectively, an angularly movable driving member carried by the camera front, said driving member being held against axial movement relative to the camera front, a tubular member connected to said front, a cam on said driving member, connections between said cam and a movably mounted optical element carried by the camera front, focusing cams of different pitch formed on the inner surface of said tubular member, said tubular member being adapted to selectively receive lens mounts of given focal lengths, each mount being provided with a cam follower so positioned thereon as to engage only one of said focusing cams when the mount is arranged on said tubular member, connections between the driving member and a lens mount positioned in said tubular member, an axially positioned guide extending from each focusing cam to the exterior of the tubular member for guiding the cam follower of the lens mount axially until it reaches the cam to be guided thereby for focusing the lens when said driving member is turned to turn the lens mount in the tubular member, a ring mounted to move angularly about the axis of the tubular member, and a guide on said ring movable therewith to and from a position in alignment with the guide in the tubular member, said ring constituting a latch for closing the end of the axial guide in the tubular member for retaining a lens mount on the camera front.

14. In a camera, the combination with a camera body, of a camera front movably mounted with respect thereto for movement to and from an open or picture-taking position, an optical range finder including fixedly and movably mounted elements on the camera body and camera front respectively, an angularly movable driving member carried by the camera front, said driving member being held against axial movement relative to the camera front, a tubular member connected to said front, a cam on said driving member, connections between said cam and a movably mounted optical element carried by the camera front, a plurality of cam grooves of different pitches formed on said tubular member and adapted to focus lenses of different focal length, said tubular member being adapted to selectively receive lens mounts of different focal lengths, each mount being provided with a cam follower so positioned thereon as to engage only one of said focusing grooves when the mount is arranged in said tubular member, means for connecting the positioned mount to the driving member so as to be actuated thereby to move the follower thereon along the said one groove to focus the mount, a guideway for directing a cam follower into its cam comprising a groove axially positioned in the tubular member and extending to the outer end thereof, and means for closing the outer end of the axial groove in the tubular member to retain the positioned lens mount therein.

15. In a camera, the combination with a camera body, of a camera front movably mounted with respect thereto for movement to and from an open or picture-taking position, an optical range finder including fixedly and movably mounted elements on the camera body and camera front respectively, an angularly movable driving member carried by the camera front, said driving member being held against axial movement relative to the camera front, a tubular member connected to said front, a cam on said driving member, connections between said cam and a movably mounted optical element carried by the camera front, a plurality of focusing cam grooves of different pitches formed on said tubular member and adapted to focus lenses of different focal length, said tubular member being adapted to selectively receive lens mounts of different focal lengths, each mount being provided with a cam follower so positioned thereon as to engage only one of said focusing grooves when the mount is arranged in said tubular member, means for connecting the positioned mount to the driving member so as to be actuated thereby to move the follower thereon along the said one groove to focus the mount, a guideway for directing a cam follower into its cam comprising a guide groove axially positioned in the tubular member and extending to the outer end thereof, and a ring forming a part of the driving member mounted to turn therewith and including an axial groove for normally holding a lens mount in place in the tubular member by closing the guiding groove of the tubular member, said ring being movable to align the axial grooves for sliding a lens mount with its cam follower to or from said tubular member.

16. In a camera, the combination with a camera body, of a camera front movably mounted with respect thereto for movement to and from an open or picture-taking position, an optical range finder including fixedly and movably mounted elements on the camera body and camera front respectively, an angularly movable driving member carried by the camera front, said driving member being held against axial movement relative to the camera front, tubular member connected to said front, a cam on said driving member, connections between said cam and a movably mounted optical element carried by the camera front, a plurality of focusing cam grooves on the inside of the tubular member of like pitch for a lens of one focal length and constituting a first set of cam grooves, a plurality of cam grooves on the inside of the tubular member of like pitch for a lens of another focal length and constituting a second set of cam grooves, a plurality of axially positioned guiding grooves leading to each of the cam grooves, said tubular member being adapted to selectively receive lens mounts of different focal lengths, each mount being provided with a plurality of cam followers so positioned thereon as to engage and move along said guide grooves and to engage only one set of focusing grooves when the mount is positioned on said tubular member, said first set of focusing cam grooves joining the guiding grooves at one distance from the end of the tubular member and said second set of focusing cam grooves joining the guiding grooves at another distance from the end of the tubular member, a stop on each lens mount limiting the movement of the mount and its cam followers axially into the tubular member, whereby each set of cam grooves may be engaged by only one set of cam followers carried by one lens mount to automatically position a lens properly in the tubular member.

17. In a camera, the combination with a camera body, of a camera front movably mounted with respect thereto for movement to and from an open or picture-taking position, an optical range finder including fixedly and movably mounted elements on the camera body and camera front respectively, an angularly movable driving member carried by the camera front, said driving member being held against axial movement relative to the camera front, a tubular member connected to said front, a cam on said driving member, connections between said cam and a movably mounted optical element carried by the camera front, a focusing cam inside the tubular member and completely enclosed thereby, a lens mount, a cam follower carried by the lens mount and adapted to engage said cam, and cooperating means on the driving member, and the lens mount comprising a spring-pressed pin and axial plot for receiving the pin for driving the lens mount from the movable driving member whereby the cam follower on the lens mount may move in the cam of the tubular member to focus said objective.

OTTO WITTEL.